US006756755B2

(12) United States Patent
Kusunoki

(10) Patent No.: US 6,756,755 B2
(45) Date of Patent: Jun. 29, 2004

(54) POWER WINDOW APPARATUS FOR VEHICLE

(75) Inventor: Kiichi Kusunoki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/218,566

(22) Filed: Aug. 15, 2002

(65) Prior Publication Data

US 2003/0052631 A1 Mar. 20, 2003

(30) Foreign Application Priority Data

Sep. 14, 2001 (JP) ....................................... 2001-280136

(51) Int. Cl.[7] ............................. H02P 1/00; H02P 1/22; H02P 1/40; H02P 3/00; H02P 5/00

(52) U.S. Cl. ........................ 318/285; 318/280; 318/287; 318/254; 318/434; 318/445

(58) Field of Search ......................... 318/254, 280–286, 318/287, 452, 453, 466–470, 469, 434, 445, 549; 388/932, 838

(56) References Cited

U.S. PATENT DOCUMENTS 4,641,067 A * 2/1987 Iizawa et al. ............... 318/287
5,521,473 A * 5/1996 Mizuno et al. ............. 318/285
6,433,498 B1 * 8/2002 Domel et al. ............... 318/280
6,548,979 B2 * 4/2003 Boisvert et al. ............ 318/469

* cited by examiner

*Primary Examiner*—Rina Duda
*Assistant Examiner*—Renata McCloud
(74) *Attorney, Agent, or Firm*—Foley & Lardner LLP

(57) ABSTRACT

A power window apparatus for a vehicle is comprised of an operation switch which includes a raising contact for outputting a window raising command when set at on-state and a lowering contact for outputting a window lowering command when set at on-state, and a controller which is arranged to execute a manual operation during a time period from a start moment at which the operation switch starts outputting one of the window raising and lowering commands to a first moment at which a first predetermined time period elapses from the start moment, to execute an automatic operation during a time period from the first moment to a second moment at which a second predetermined time period elapses from the start moment, and to execute the manual operation from the second moment.

12 Claims, 3 Drawing Sheets

POWER WINDOW APPARATUS FOR VEHICLE

BACKGROUND OF THE INVENTION

The present invention relates to a power window apparatus for a vehicle, and more particularly to a power window apparatus which is capable of preventing a foreign matter from being excessively sandwiched between a window glass and a window flame.

Power window apparatuses have been widely used in automotive vehicles to facilitate driver's operations for opening and closing window glasses of a vehicle. A typical power window apparatus is capable of executing a manual operation for opening and closing a window glass for a period during which an opening/closing operation switch is set at on-state, an automatic operation for opening the window glass to a full open state and closing the window glass to a full close state, and a sandwich preventing function for preventing a foreign matter from being sandwiched between a window glass and a window frame. Since two-contact type operation switch is widely used in such a power window apparatus to lower the cost of production, a switching between the manual operation and the automatic operation is executed on the basis of a time period during which the operation switch is being turned on.

SUMMARY OF THE INVENTION

However, such a power window apparatus employing a two-contact type operation switch has a problem that it is difficult, due to an operational limitation of the two-contact type operation switch, to smoothly execute both of a positional justification of a window glass and an accurate detection of a foreign matter sandwiched between the window glass and a window frame.

It is therefore an object of the present invention to provide an improved power window apparatus which is capable of smoothly executing both of a positional justification of a window glass and an accurate detection of a foreign matter so as to enable a window closing operation even under a large-frictional condition of the window glass.

An aspect of the present invention resides in a power window apparatus for a vehicle which comprises: a drive motor for raising and lowering a window glass; an operation switch comprising a raising contact which outputs a window raising command when the raising contact is set at on-state and a lowering contact which outputs a window lowering command when the lowering contact is set at on-state; and a controller coupled to the drive motor and the operation switch. The controller is arranged to execute a manual operation during a time period from a start moment at which the operation switch starts outputting one of the window raising and lowering commands to a first moment at which a first predetermined time period elapses from the start moment, to execute an automatic operation during a time period from the first moment to a second moment at which a second predetermined time period elapses from the start moment, and to execute the manual operation from the second moment.

Another aspect of the present invention resides in a method of controlling a drive motor for raising and lowering a window glass which comprises a step for executing a manual operation during a time period from a start moment at which an operation switch outputs one of a window raising and lowering commands to a first moment at which a first predetermined time period has elapsed from the start moment; a step executing an automatic operation during a time period from the first moment to a second moment at which a second predetermined time period has elapsed from the start moment, and a step for executing the manual operation from the second moment.

A further another aspect of the present invention resides in a power window apparatus for a vehicle, comprising: a drive motor for raising and lowering a window glass; an operation switch outputting a window closing command when a vehicle occupant turns on the operation switch; a rotation detector attached to the drive motor and detecting a rotation speed of the drive motor; and a controller coupled to the drive motor, the operation switch and the rotation detector. The controller is arranged to operate the drive motor so as to raise the window glass from a start moment at which the operation switch outputs the window raising command, to count an elapsed time from the start moment, to calculate a load applied to the drive motor on the basis of the rotation speed of the drive motor, to stop operating the drive motor when the load is greater than a predetermined load, to operate the drive motor so as to lower the window glass when the operation switch stops outputting the window raising command before the elapsed time reaches a predetermined time period and when the load is greater than the predetermined load, to restart the operation of the drive motor to raise the window glass from a moment at which the elapsed time reaches the predetermined time period and when the operation switch continues outputting the window raising signal.

The other objects and features of this invention will become understood from the following description with reference to the accompanying drawings.

DETAILED DESCRIPTION OF THE INVENTION

Referring to FIGS. 1 through 4C, there will be discussed an embodiment according to the present invention.

Figure 1:
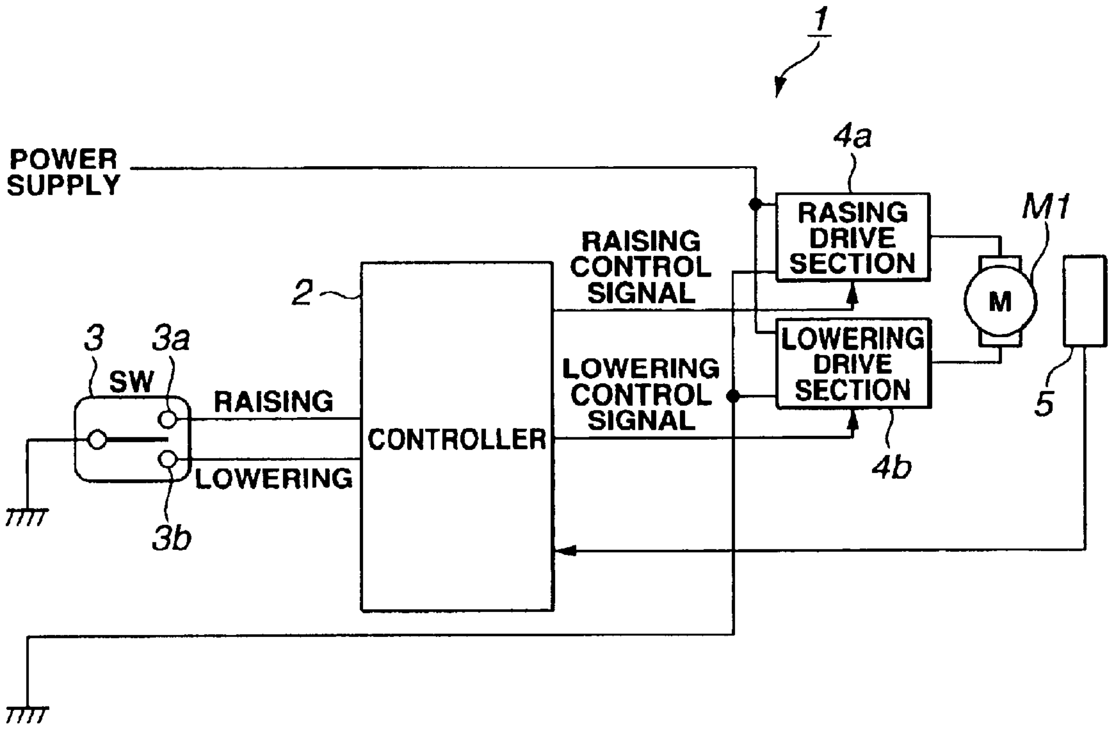
FIG. 1 is a block diagram showing a power window apparatus according to an embodiment of the present invention.

FIG. 1 is a block diagram showing a structure of a power window apparatus 1 according to the embodiment of the present invention. In this Figure, power window apparatus 1 comprises a drive motor M1 which moves a window glass (not shown) to an opening direction (lowering direction) and a closing direction (raising direction), a controller 2 and an operation switch (opening/closing operation switch) 3. Further, power window apparatus 1 comprises a raising drive section 4_a_ for applying a raising control signal to drive motor M1 to raise the window glass, and a lowering drive section 4_b_ for applying a lowering control signal to drive motor M1 to lower the window glass, and a rotation detector (load detecting means) 5 for detecting a rotation speed of drive motor M1.

Operation switch 3 comprises a raising contact 3*a* which outputs a window raising command to controller 2 during when raising contact 3*a* is turned on, and a lower contact 3*b* which outputs a window lowering command to controller 2 during when lowering contact 3*a* is turned on. A vehicle occupant manually operates operation switch 3.

Subsequently, there will be discussed the manner of operation of power window apparatus 1 according to the present invention.

When a vehicle occupant operates operation switch 3, controller 2 detects the window raising command or window lowering command of the vehicle occupant through the operation switch 3. When raising contact 3*a* is turned on, controller 2 outputs the raising control signal to raising drive section 4*a*. When lowering contact 3*b* is turned on, controller 2 outputs the lowering control signal to lowering drive section 4*b*.

During these operations, when an operation time period $T_{OP}$, which is a time period during which one of raising contact 3*a* and lowering contact 3*b* is set at on-state, is smaller than a first predetermined time period T1 or is greater than or equal to a second predetermined time period T2 which is greater than first predetermined time period T1 ($T_{OP}<T1$ or $T2 \leqq T_{OP}$), controller 2 outputs one of the raising and lowering control signals according to operation time period $T_{OP}$. That is, a manual operation is executed. On the other hand, when operation time period $T_{OP}$ is greater than or equal to first predetermined time period T1 and is smaller than second predetermined time period T2 ($T1 \leqq T_{OP}<T2$), controller 2 outputs one of the raising and lowering control signals to raise or lower the window glass to a full close state or a full open state.

Herein, the manual operation executed during which operation time period $T_{OP}$ is smaller than first predetermined time period T1 is called a short manual operation. The operation executed during which operation time period $T_{OP}$ is greater than or equal to first predetermined time period T1 and is smaller than second predetermined time period T2 is called a one-touch automatic operation. The manual operation executed during which operation time period $T_{OP}$ is greater than or equal to second operation time period T2 is called a long manual operation.

Each of raising and lowering drive sections 4*a* and 4*b* is normally set so that both terminals of drive motor M1 are connected to the earth side. When one of drive sections 4*a* and 4*b* receives the control signal, the one of raising and lowering drive sections 4*a* and 4*b* changes the connection of drive motor M1 from the earth side to the power source side so as to operate drive motor M1.

Figure 2:
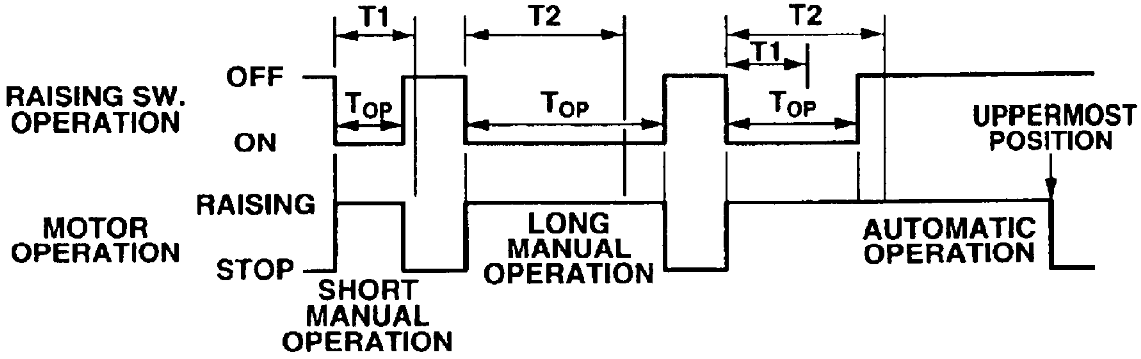
FIG. 2 is a timing chart showing a main operation of the power window apparatus of FIG. 1.

In FIG. 2, an upper time chart shows on and off timings of raising contact 3*a*, and a lower time chart shows an operating condition of drive motor M1. As shown in FIG. 2, when operation time period $T_{OP}$ is shorter than first predetermined time period T1, the short manual operation is executed. That is, the window glass is raised only for a time period during which the raising contact 3*a* is set at the on-state.

Further, when operation time period $T_{OP}$ is longer than or equal to second predetermined time period T2, the long manual operation is executed. That is, the window glass is also raised only for a time period during which the raising contact 3*a* is set at the on-state.

Furthermore, when operation time period $T_{OP}$ of raising contact 3*a* is within a range from first predetermined time period T1 to second predetermined time period T2 ($T1 \leqq T_{OP}<T2$), the one-touch automatic operation is executed. Therefore, the window glass is raised to the full close state by this one-touch automatic operation.

That is, when the short or long manual operation is executed, drive motor M1 is driven for a period during which one of raising contact 3*a* and lowering contact 3*b* is set at on-state. On the other hand when the one-touch automatic operation is executed, drive motor M1 is driven until the window glass is fully closed or fully opened.

Power window apparatus 1 according to the present invention is arranged to calculate a predicted load $L_P$ on the basis of the output signal of rotation detector 5. Predicted load $L_P$ represents a magnitude of a load which will be applied to the window glass when the window glass is raised by operating the drive motor M1. That is, rotation detector 5 detects the rotation speed of drive motor M1 and outputs the detection signal indicative of the rotation speed to controller 2. Controller 2 calculates the magnitude of load (predicted load) $L_P$ applied to drive motor M1 from the magnitude of the predicted load $L_P$ and determines whether or not a foreign matter is sandwiched between the window glass and a window frame. It will understood that a method of obtaining the magnitude of the predicted load $L_P$ is not limited to this, and the magnitude of the predicted load $L_P$ may be obtained on the basis of the power consumption of drive motor M1.

When controller 2 determines that the predicted load $L_P$ is greater than a predetermined value, the raising of the window glass is temporally stopped. Further, when raising contact 3*a* of operation switch 3 is maintained at the on-state thereafter, controller 2 restarts the raising operation of the window glass.

Figure 3:
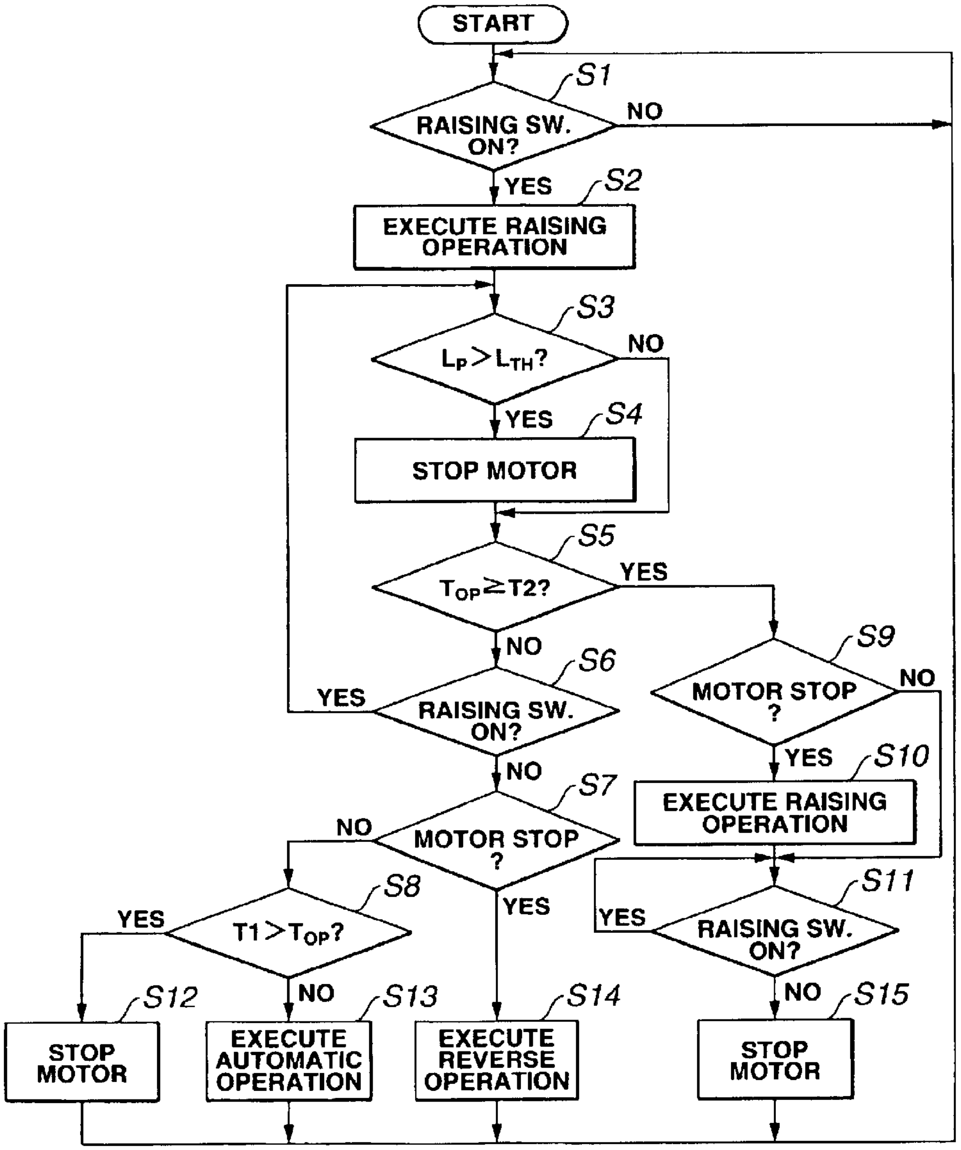
FIG. 3 is a flowchart showing a control procedure executed in the event that a foreign matter is sandwiched during the window raised by the power window apparatus of FIG. 1.

With reference to a flowchart of FIG. 3, the operation of power window apparatus 1 according to the present invention will be discussed in detail.

At step S1, controller 2 determines whether or not raising contact 3*a* of operation switch 3 is set at on-state. When the determination at step S1 is affirmative, the routine proceeds to step S2. When the determination at step S1 is negative, the routine repeats step S1 until the determination at step S1 is turned to the affirmative determination.

At step S2, controller 2 executes the window raising operation. More specifically, controller 2 outputs the raising control signal to raising drive section 4*a* to operate drive motor M1 so as to raise the window glass.

At step S3, controller 2 determines whether or not the predicted load $L_P$, which will be applied to the window glass, is greater than a predetermined value $L_{TH}$, on the basis of an output signal of rotation detector 5. When the determination at step S3 is negative ($L_P \leqq L_{TH}$), the routine jumps to step S5 without stopping drive motor M1. When the determination at step S3 is affirmative ($L_P>L_{TH}$), the routine proceeds to step S4 wherein controller 2 stops drive motor M1 by the cancellation of outputting the raising control signal.

At step S5, controller 2 determines whether or not the operation time period $T_{OP}$, during which raising contact 3*a* is set at the on-state, is greater than or equal to second predetermined time period T2. When the determination at step S5 is negative ($T_{OP}<T2$), the routine proceeds to step S6.

At step S6, controller 2 determines whether or not raising contact 3*a* of operation switch 3 is set at on-state. When the determination at step S6 is affirmative, the routine returns to step S3 to repeat steps S3 and S5 until the affirmative determination is made at step S5. That is, controller 2 outputs the raising control signal to raising drive section 4*a* to drive the drive motor M1 in the window raising direction. When the determination at step S6 is negative, that is, when raising contact 3*a* is set at off-state, the routine proceeds to step S7.

At step S7, controller 2 determines whether or not drive motor M1 is set at stop state. When the determination at step S7 is affirmative, the routine proceeds to step S14 wherein controller 2 executes a reverse operation. More specifically, controller 2 outputs the lowering control signal to lowering drive section 4*b* to drive the drive motor M1 toward the window lowering direction. That is, in the event that the predicted load $L_P$ becomes greater than a predetermined load $L_{TH}$ during the window raising operation after the operator turns on raising contact 3*a*, and that the operator then turns off raising contact 3*a*, controller 2 determines that a foreign matter is sandwiched between the window glass and a window frame. Therefore, controller 2 inversely drives the drive motor M1 to lower the window glass. This operation prevents a foreign matter from being excessively sandwiched between the window glass and the window flame.

On the other hand, when the determination at step S7 is negative, that is, when drive motor M1 continues the on-state, the routine proceeds to step S8 wherein controller 2 determines whether or not the operation time period $T_{OP}$ is smaller than a first predetermined time period T1. When the determination at step S8 is affirmative ($T1>T_{OP}$), the routine proceeds to step S12 wherein controller 2 stops the operation of drive motor M1 by the cancellation of outputting the raising control signal to raising drive section 4*a*. When the determination at step S8 is negative ($T1\leqq T_{OP}$), the routine proceeds to step S13 wherein controller 2 executes a one-touch automatic operation.

On the other hand, when the determination at step S5 is affirmative ($T_{OP}>T2$), the routine proceeds from step S5 to step S9 wherein controller 2 determines whether or not drive motor M1 is set at stop state. When the determination at step S9 is affirmative, the routine proceeds to step S10 wherein controller 2 outputs the raising control signal to raising drive section 4*a* to drive the drive motor M1 so as to raise the window glass.

Thereafter, the long manual operation is executed. Accordingly, at step S11 controller 2 detects a moment at which raising contact 3*a* is turned off by determining whether raising contact 3*a* is put in the on-state or not. When the determination at step S11 is negative, that is, when it is determined that raising contact 3*a* is set at off state, the routine proceeds to step S15 wherein controller 2 stops outputting the raising control signal to raising drive section 4*a* to stop drive motor M1.

As discussed above, drive motor M1 is selectively set at one of on-state, the inverse-on-state and the stopping state according to the on-and-off operation by the vehicle occupant and according to the magnitude of the predicted load $L_P$.

Figure 4A:
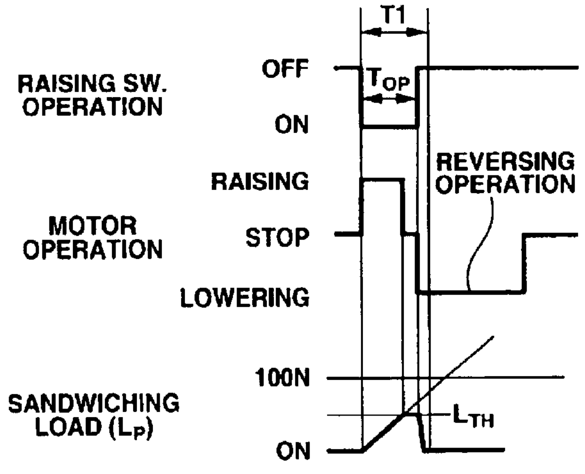
FIGS. 4A, 4B and 4C are timing charts showing the operations of a drive motor in the event that a foreign matter is sandwiched during the window raising period.
Figure 4B:
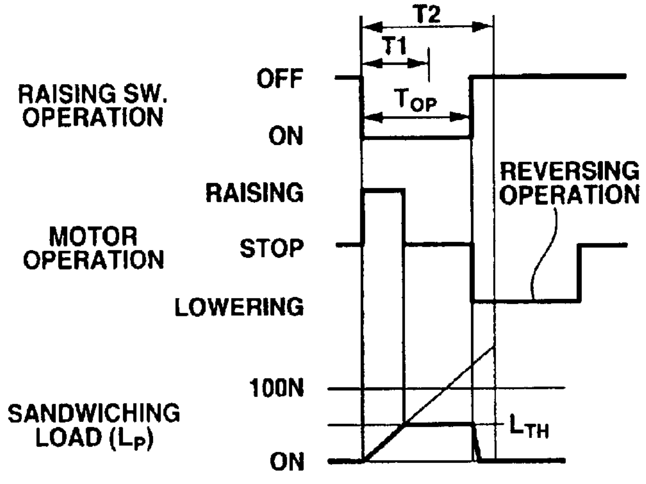
Figure 4C:
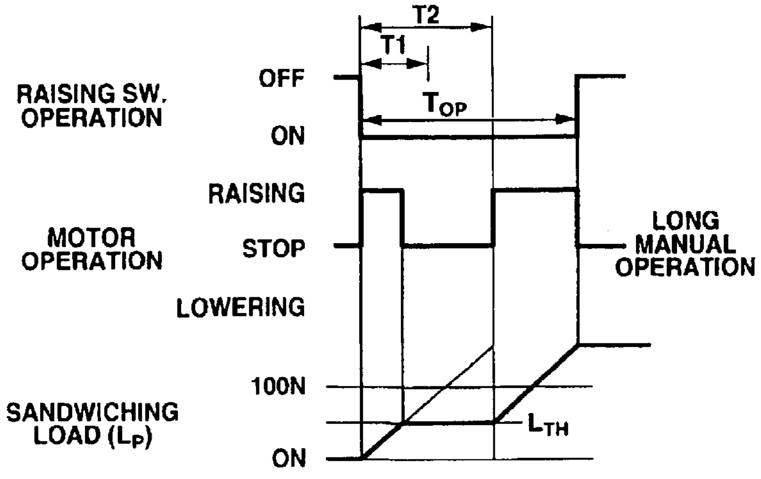

Referring to FIGS. 4A through 4C, there will be explained the operations of the power window apparatus according to the present invention. FIG. 4A is a timing chart under a condition that the short manual operation is executed, FIG. 4B is a timing chart under a condition that the one-touch automatic operation is executed. FIG. 4C is a timing charts under a condition that the long manual operation is executed.

As shown in FIG. 4A, in the event that the operation time period $T_{OP}$ of raising contact 3*a* is smaller than first predetermined time period T1 ($T_{OP}<T1$) and that a foreign matter is sandwiched between the window glass and the window frame, the sandwiching load gradually increases after raising contact 3*a* is turned on, and drive motor M1 is then stopped at a moment at which the predicted load $L_P$ reaches the predetermined load $L_{TH}$. Thereafter, the raising contact 3*a* is turned off, and drive motor M1 is then inversely operated to lower the window glass. This arrangement prevents a sandwiching problem of the window glass.

Further, as shown in FIG. 4B, in the event that the operation time period $T_{OP}$ of raising contact 3*a* is within a range from first predetermined time period T1 to second predetermined time period T2 ($T1\leqq T_{OP}<T2$), similarly the drive motor M1 is stopped at a moment at which the predicted load $L_P$ reaches the predetermined load $L_{TH}$, and the drive motor M1 is inversely operated after the raising contact 3*a* is turned off.

Furthermore, as shown in FIG. 4C, in the event that the operation time period Top of raising contact 3*a* is greater than or equal to second predetermined time period T2 ($T_{OP}\geqq T2$), drive motor M1 is temporally stopped at a moment at which sandwiching load $L_P$ reaches the predetermined load $L_{TH}$. Thereafter, when the operation time period $T_{OP}$ of raising contact 3*a* becomes equal to second predetermined time period T2 elapsed, drive motor M1 is again driven to raise the window glass. Accordingly, even when controller 2 determines that a foreign matter is sandwiched between the window glass and the window frame from the reason that the sliding friction of the window glass increases, by continuing the on-state of raising contact 3*a*, the window glass is raised. That is, even if an erroneous detection due to the sliding friction occurs, power window apparatus 1 according to the present invention can suitably adapt to such a situation.

With the thus arranged power window apparatus 1 according to the present invention, by turning on operation switch 3 for a period that the operation time period $T_{OP}$ is smaller than first predetermined time period T1, the short manual operation is executed so that the operator can finely control the position of the window glass. Further, by turning on operation switch 3 for a period that the operation time period $T_{OP}$ is within the range from first predetermined time period T1 and second predetermined time period T2, the one-touch automatic operation is executed. This enables the window glass to be easily set at the full-close state or full-open state. Furthermore, by turning on operation switch 3 for a period that the operation time period $T_{OP}$ is greater than second predetermined time period T2, the long manual operation is executed. This enables the window glass to be stopped at a predetermined position.

Furthermore, in the event that the window glass is raised by the short manual operation or the one-touch automatic operation, if the predicted load $L_P$ increases, drive motor M1 is temporally stopped. Thereafter, drive motor M1 is inversely operated to lower the window glass. This prevents a trouble caused by sandwiching a foreign matter between the window glass and the window frame.

Furthermore, in the event that the operator continues turning-on of operation switch 3 even after drive motor M1 is stopped, the window glass is raised by this continuation of the turning-on of operation switch 3. Accordingly, even if the sliding friction of the window glass increases, it is possible to raise the window glass by the manual continuous turning-on operation by the vehicle occupant.

This application is based on Japanese Patent Application No. 2001-280136 filed on Sep. 14, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A power window apparatus for a vehicle, comprising:

a drive motor for raising and lowering a window glass;

an operation switch comprising a raising contact which outputs a window raising command when the raising contact is set at an on-state and a lowering contact which outputs a window lowering command when the lowering contact is set at an on-state; and a controller coupled to the drive motor and the operation switch, the controller being adapted to execute an automatic operation for raising the window glass to a full close state when an operation period of outputting the window raising command is greater than a first period and is not greater than a second period which is greater than the first period, and to execute a manual operation for raising the window glass when the operation period is smaller than the first period or greater than the second period.

2. The power window apparatus as claimed in claim 1, further comprising a load detecting device which detects a load applied to the drive motor, the controller stopping a window raising operation of the drive motor when the load detecting device detects that the load applied to the drive motor is greater than a predetermined load at a moment during the second period.

3. The power window apparatus as claimed in claim 2, wherein the controller starts a window lowering operation of the drive motor when the operation switch stops outputting the window raising command during the second period.

4. The power window apparatus as claimed in claim 2, wherein the controller restarts the window raising operation when the operation switch continues outputting the window raising command after the second period.

5. The power window apparatus as claimed in claim 4, wherein the controller stops the window raising operation when the operation switch stops outputting the window raising command.

6. The power window apparatus as claimed in claim 1, wherein the manual operation includes a window raising operation of raising the window glass for a time period during which the raising contact is set at the on-state and a window lowering operation of lowering the window glass for a time period during which the lowering contact is set at the on-state, and the automatic operation includes a one-touch automatic operation by which the window glass is raised to a full close state or lowered to a full open state.

7. The power window apparatus as claimed in claim 1, further comprising a raising drive section and a lower drive section through which the controller controls the operation of the drive motor.

8. The power window apparatus as claimed in claim 1, wherein the controller is further arranged to execute an automatic lowering operation for lowering the window glass to a full open state when an operation period of outputting the window lowering command is greater than a third time period and is not greater than a fourth time period which is greater than the third period, and to execute a manual lowering operation for lowering the window glass when the operation period is smaller than the third time period or greater than the fourth time period.

9. The power window apparatus as claimed in claim 8, wherein the third time period is equal to the first period, and the fourth time period is equal to the second period.

10. A method of controlling a drive motor for raising and lowering a window glass, comprising:

executing an automatic operation, for raising the window glass to a full close state when an operation period of outputting a window raising command is greater than a first period and is not greater than a second period which is greater than the first period; and executing a manual operation for raising the window glass when the operation period is smaller than the first period or greater than the second period.

11. A power window apparatus for a vehicle, comprising:

driving means for raising and lowering a window glass;

switch means for outputting one of a window closing command and a window opening command according to an intent of a vehicle occupant;

a first execution means for executing an automatic operation for raising the window glass to a full close state when an operation period of outputting the window closing command is greater than a first period and is not greater than a second period which is greater than the first period; and a second execution means for executing a manual operation for raising the window glass when the operation period is smaller than the first period or greater than the second period.

12. A power window apparatus for a vehicle, comprising:

a drive motor for raising and lowering a window glass;

an operation switch outputting a window closing command when a vehicle occupant turns on the operation switch;

a rotation detector attached to the drive motor and detecting a rotation speed of the drive motor; and a controller coupled to the drive motor, the operation switch and the rotation detector, the controller being arranged, to operate the drive motor so as to raise the window glass from a start moment at which the operation switch outputs a window raising command, to count an elapsed time from the start moment, to calculate a load applied to the drive motor on the basis of the rotation speed of the drive motor, to stop operating the drive motor when the load is greater than a predetermined load, to operate the drive motor so as to lower the window glass when the operation switch stops outputting the window raising command before the elapsed time reaches a predetermined time period (A) and when the load is greater than the predetermined load, to restart the operation of the drive motor to raise the window glass from a moment at which the elapsed time reaches the predetermined time period and when the operation switch continues outputting the window raising command, and to execute an automatic operation for raising the window glass to a full close state when the window closing command is outputted for a time period ranging from a predetermined period (B) to the predetermined period (A) and when the load is smaller than or equal to the predetermined load.

* * * * *